Sept. 29, 1959  O. K. KELLEY  2,906,518
VISCOSIMETER TYPE GOVERNORS
Filed June 29, 1955
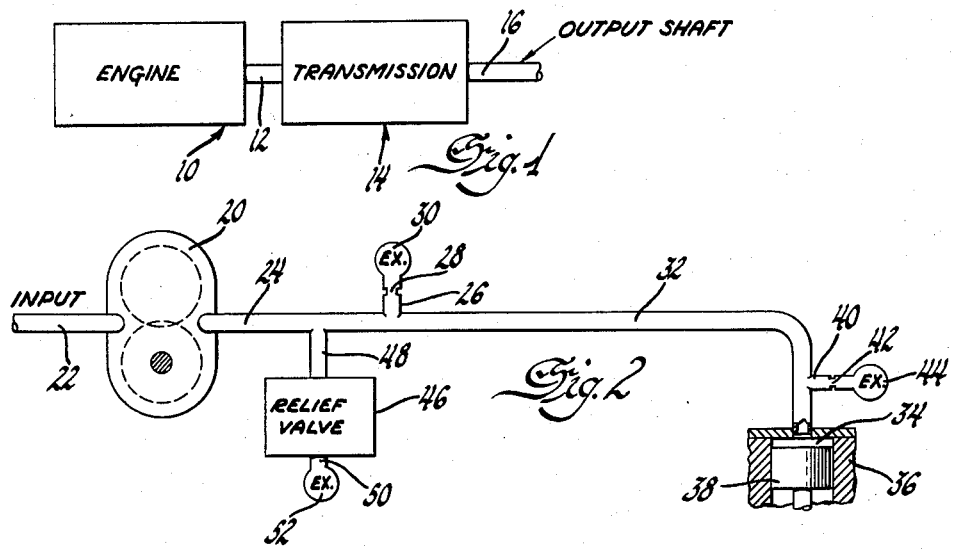
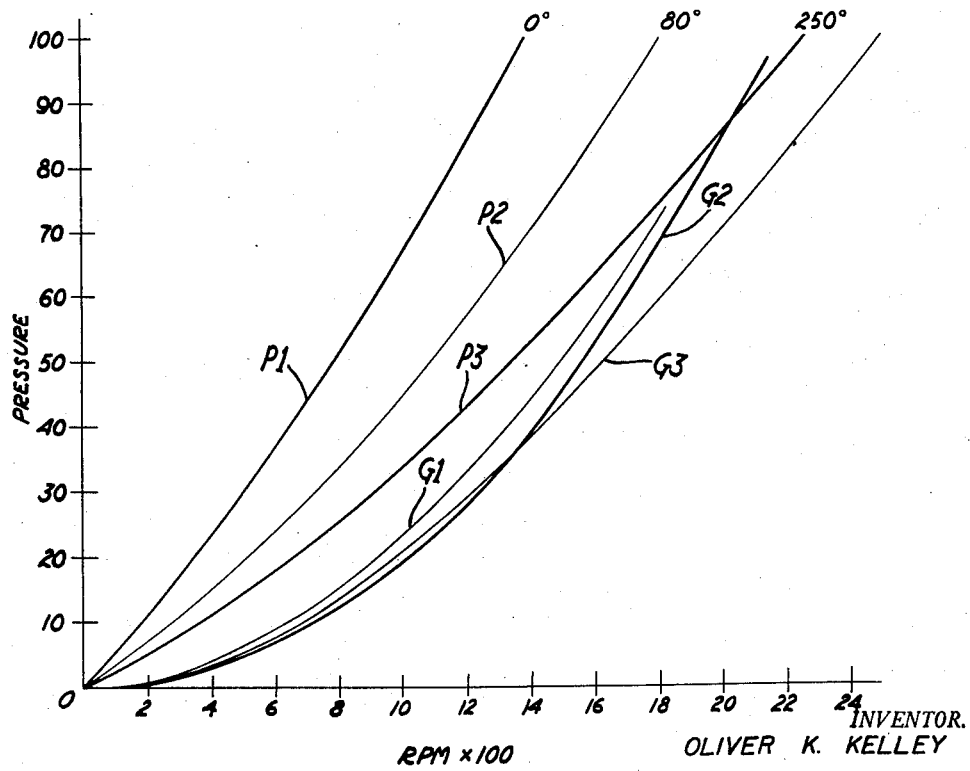
INVENTOR.
OLIVER K. KELLEY
BY
W. C. Middleton
ATTORNEY

United States Patent Office 2,906,518
Patented Sept. 29, 1959

2,906,518

VISCOSIMETER TYPE GOVERNORS

Oliver K. Kelley, Bloomfield Hills, Mich., assignor to General Motors Corporation, Detroit, Mich., a corporation of Delaware Application June 29, 1955, Serial No. 518,896

6 Claims. (Cl. 264—14)

This invention relates to viscosimeter type governors and more particularly to such governors especially adapted for use in hydraulically operated automatic transmissions.

Heretofore efforts have been made to utilize pumps as governors in mechanism wherein a predetermined increase in pressure is desired for operating various parts of the mechanism. For example, in automatic transmissions, output shaft driven pumps have been utilized to provide hydraulic pressure which increases with increase in output shaft speed and consequently, increase in the speed of a vehicle driven by such transmission. To aid in obtaining the proper pressure relative to speed of rotation of the pump for operating shift valves and the like, the discharge line of the pump has been provided with an orifice near the pump through which oil can be discharged. A line so orificed will then deliver pressure which will increase in a predetermined manner in proportion to the increase in speed of rotation of the shaft driving the pump. However, such arrangements possess distinct disadvantages particularly in that the pressure in a delivery line so orificed will vary materially as the viscosity of the liquid, such as oil, may vary. For example, when the oil being pumped is at one viscosity, such as when it is cold, the pressure delivered by the orificed discharge line will vary over a well defined range. Furthermore, if the viscosity is materially different, such as when the oil is hot, the delivered pressure will increase over a different range. Consequently, if it is desired that parts of the transmission be operated at a predetermined output shaft speed, such operation will occur at different speeds as the viscosity of the oil may vary.

An object of the present invention is to provide a governor in which the pressure utilized for operating a part of a mechanism increases over a predetermined range with substantial uniformity over a wide range of viscosity of the fluid under pressure.

Another object of the invention is to provide a governor arrangement in which the delivery line is provided with an orifice adjacent to the pump outlet, is provided with an extension in the nature of a relatively small tube of a predetermined length, and is finally provided with an orifice adjacent to the part of the mechanism to be acted upon by governor pressure.

A further object of the invention is to provide a governor arrangement in which escape paths such as orifices are spaced by a relatively small tube of predetermined length so that the pressure at the orifice remote from the pump will increase at the same rate over a predetermined range for fluid of various viscosities.

In carrying out the foregoing and other objects of the invention, a pump such as a gear pump, which can be driven by any shaft such as the output shaft of a transmission, has the discharge thereof connected to a tube which extends to the work area at which the delivered pressure is to be exerted. The discharge line of the pump is provided with a restricted orifice near the pump and is provided with a restricted second orifice near the work area. These two orifices are so calibrated in relation to the size and expanse of tube between them as to obtain a pressure increase in the work area substantially the same for various viscosities of the liquid delivered by the pump. In addition the discharge line is provided with a relief valve or the like for limiting the pressure delivered by the pump, with the relief valve set high enough to assure that the pressure adjacent to the pump necessary in the operation of the governor can be obtained. Inasmuch as a long small tube offers greater resistance to oil flow than a thin-edged orifice, it is possible to determine the size and length of tube which may be necessary in the obtaining of the desired pressure at the work area.

The manner in which this new type of governor performs its desired functions and the reasons therefor will be apparent from the following detailed description of the accompanying drawings wherein:

Figure 1 is a schematic view of a type of installation in which the governor may be employed;

Figure 2 is a schematic circuit diagram of the governor with its necessary components; and Figure 3 is a pressure chart showing the results obtained by a particular governor of this character.

Referring to the drawings and particularly to Figure 1, 10 illustrates a source of motive power, such as an engine, utilized for driving a vehicle. The output shaft 12 of this engine is connected to drive a transmission indicated at 14, which transmission may be of any well known type but preferably is of the type requiring the use of hydraulic force for actuating parts thereof and preferably of the type in which a change in the transmission is effected at a predetermined speed of the output shaft 16 thereof for a predetermined condition such as a throttle position of the engine and the like.

This transmission may have incorporated therein a pump 20 driven by a part of the output shaft within the housing of the transmission. Pump 20 may be of any well known type such as a gear pump which delivers a definite volume of liquid such as oil for each revolution thereof. The pump 20 draws oil from a sump (not shown) through the input or suction line 22 and delivers this oil to a discharge line 24. Adjacent to the outlet of the pump and connected to the discharge line 24 is a passage 26 having a restricted orifice 28 therein. The line 26 discharges oil through the orifice to an exhaust port or passage 30 which may be in communication with the sump. That portion 32 of the discharge line 24 extending beyond the passage 26 is of predetermined diameter and of predetermined length and extends to a port in communication with the bore 34 of a valve body 36 in which is slidable a valve member 38. The valve member or other part to which this member 38 is connected or upon which it operates, may be of any character desired so long as movement of the member 38 is required when a predetermined pressure is attained in the bore 34 at the end of member 38. Adjacent to the body 36 is an additional passage 40 having a restricted orifice 42 therein in communication with another exhaust passage 44 which may also extend to the sump from which oil is drawn. A relief valve indicated generally at 46 is connected by line 48 to the discharge line 24 and has a discharge passage 50 extending to exhaust at 52. The relief valve 46 may be of any well known type operating to exhaust oil from the line 24 whenever the pressure in this line and acting on the valve is above a predetermined maximum.

The operation of this arrangement for producing a governor pressure increasing in a predetermined fashion with increase in speed of rotation of a shaft such as output shaft 16 will be understood better when consideration is given to the following factors. If it is assumed that the pump is of the type which will deliver a predetermined volume of oil for each revolution thereof and if the desired pressures for various shaft speed are known, the size of the orifices 28 and 42 and the length of the tubular connection 32 can be determined. For example, let it be assumed that a governor pressure of 40 p.s.i. is desired for an output shaft speed of 1400 r.p.m. If the pump delivers .4 cu. in. per revolution, it will be evident that the system must be capable of discharging approximately 9.33 cu. in. of oil per second. Assuming further that the oil has a viscosity corresponding to that which would exist in transmission oil at 250° F., the size of the orifice 42 and the length of the tube 40 can be determined. If 40 p.s.i. is to be impressed in the space 34 at 1400 r.p.m. and if the orifice 42 has a diameter of .125 in. sufficient pressure must be exerted by the pump 20 to cause approximately 4.7 cu. in. of oil to flow through orifice 42 per second. Of the volume of oil being pumped therefore a remainder of 4.63 cu. in. must be discharged through the orifice 28 and if this orifice has a diameter of .120 in., 50 p.s.i. at the pump or immediately adjacent thereto will be necessary for the discharge of this quantity. The tube 32 therefore can be of length to compensate for the differences in pressures at the two orifices. Assuming now that the oil has a viscosity corresponding to that of transmission oil at 10° F. it is known that with the same r.p.m. of the pump, i.e., 1400, that a pressure of 40 p.s.i. in space 34 will cause a flow of 3 cu. in. per second through the orifice 42. With only 3 cu. in. being discharged through orifice 42, it is necessary that the remaining 6.33 cu. in. of oil must be discharged through the orifice 28, which will require a pressure adjacent to the pump and orifice 28 of approximately 178 p.s.i. So long as the relief valve 46 is set to relieve the system only at a pressure higher than 178 p.s.i., it is evident that the desired pressure in the working space 34 can be obtained with the predetermined expanse of tube 32 between the orifices 28 and 42.

A concrete example of actual tests of a governor installation of this type has been set forth in Figure 3 and for this particular governor installation the orifices 28 and 42 each had an area of .01 sq. in. The expanse of tube 32 between the orifices 28 and 42 was approximately 24" in length and the tube had an internal diameter of 5/16". Referring to Figure 3, it will be seen the tests showed an increase in pressure from zero to 100 lbs. when oil having a viscosity similar to that of transmission oil at zero° F. was being supplied by the pump 20. The pressure of oil under this temperature condition increased in accordance with the line P1 of Figure 3. This pressure was measured in the conduit between the pump 20 and the orifice 28. The pressure in the chamber 34, however, increased in accordance with the line G1. The pressure in the operating chamber 34 attained 40 p.s.i. at approximately 1350 r.p.m. of the pump. When oil having a viscosity corresponding to that of transmission oil at 80° F. was being pumped, the pressure thereof between the pump and orifice 28 increased in accordance with the line P2. However, the governor pressure, i.e., that at the chamber 34, increased in accordance with the line G2 and it will be noted that at 1400 r.p.m. the pressure in chamber 34 was approximately 40 p.s.i. When the pump was delivering oil having a viscosity corresponding to that of transmission oil at 250° F., the pressure between the pump and orifice 28 increased in accordance with the line P3. The pressure in chamber 34, however, increased in accordance with line G3 with the attainment of 40 p.s.i. in chamber 34 at approximately the same speed of pump rotation as for oil at 80° F.

From the foregoing graph it is apparent that proper calibration of the orifices 28 and 42 and with a proper length of tube of a particular diameter between such orifices, governor pressure increasing over a range different from pump pressure and increasing over this range substantially without regard to oil viscosity can be obtained.

The present explanation of this type of governor has been given with a description of an orifice 28 adjacent to the pump outlet with the understanding that such an orifice will be required only if the pump is tight enough to possess no internal leakage. However, if the pump has a loose fit and can leak, it may be said to possess a phantom orifice which will serve the same purpose as the definite orifice 28. From the foregoing it will be seen that the present governor structure provides a mechanism whereby pressures for operating various parts of a transmission can be obtained with the pressures increasing to a predetermined degree over the range of operation of the pump and with minute variation in pressure for variation in oil viscosity. In view thereof it is to be understood that the invention is to be limited only by the scope of the following claims.

What is claimed is:

1. A governor for delivering to a work chamber hydraulic pressure increasing in proportion to increase in speed of rotation of a rotating shaft, said governor comprising a pump driven by said shaft, a conduit for liquid from said pump to said work chamber, said conduit being provided with an orifice adjacent to said chamber, said orifice being arranged to discharge liquid from said conduit, and means at said pump arranged to discharge liquid from said conduit so as to reduce the volume of liquid supplied through said conduit, said conduit comprising flow resistance means interposed between said means at said pump and said orifice for inducing into the conduit a resistance to liquid flow therethrough, the discharge capacities of said means at said pump and said orifice being such as to compensate for variations in the flow resistance so that increase in pressure in said chamber is substantially the same for liquids of different viscosities.

2. A governor for delivering to a work chamber hydraulic pressure increasing in proportion to increase in speed of rotation of a rotating shaft, said governor comprising a pump driven by said shaft, a conduit for liquid from said pump to said work chamber, said conduit being provided with an orifice adjacent to said chamber arranged to discharge liquid from said conduit, and being provided with an orifice at said pump arranged to discharge liquid from said conduit so as to reduce the volume of liquid supplied through said conduit, said conduit comprising flow resistance means interposed between said orifices for providing a resistance to liquid flow through said conduit that varies with changes in the viscosity of the liquid, the discharge capacities of said orifices being such as to compensate for variations in the flow resistance so that increase in pressure in said chamber is substantially the same for liquids of different viscosities.

3. A governor for delivering to a work chamber hydraulic pressure increasing in proportion to increase in speed of rotation of a rotating shaft, said governor comprising a pump driven by said shaft, said pump delivering a predetermined volume of liquid each revolution thereof, a conduit for liquid from said pump to said work chamber, said conduit being provided with an orifice adjacent to said chamber arranged to discharge liquid from said conduit, and means at said pump arranged to discharge liquid from said conduit so as to reduce the volume of liquid supplied through said conduit, said conduit comprising flow resistance means interposed between said means at said pump and said orifice for providing a resistance to liquid flow through the conduit that varies with changes in the viscosity of the liquid, the discharge capacities of said means at said pump and said orifice being such as to compensate for variations in the flow resistance so that increase in pressure in said chamber is in substantially the same proportion relative to rotative speed of said shaft for liquids of different viscosities.

4. A governor for delivering to a work chamber hydraulic pressure increasing in proportion to increase in speed of rotation of a rotating shaft, said governor comprising a constant displacement pump driven by said shaft, a conduit for liquid from said pump to said work chamber, said conduit being provided with an orifice adjacent to said chamber arranged to discharge liquid from said conduit, and being provided with an orifice at said pump arranged to discharge liquid from said conduit so as to reduce the volume of liquid supplied through said conduit, said orifice adjacent said chamber having such discharge capacity that a predetermined pressure at said chamber causes discharge of quantities of liquid varying with the viscosity of the liquid, the length and size of the conduit between said orifices being such that a resistance to liquid flow through the conduit is offered that varies with changes in the viscosity of the liquid, the discharge capacities of said orifices being so correlated that with an increase in said flow resistance the discharge capacities of each will proportionately increase to cause the pressure in said chamber to be relatively uninfluenced by changes in viscosity of the liquid.

5. A governor for delivering hydraulic pressure to a work chamber with said pressure increasing in proportion to increase in speed of rotation of a rotatable shaft, said governor comprising a constant displacement pump driven by said shaft, a conduit for liquid from said pump to said work chamber, said conduit being provided with an orifice adjacent to said chamber arranged to discharge fluid from said conduit, and being provided with an orifice adjacent to said pump arranged to discharge fluid from said conduit so as to reduce the volume of liquid supplied through said conduit, the orifice adjacent to said work chamber having such discharge capacity that a predetermined liquid pressure at said chamber will cause discharge of a volume of liquid varying with the viscosity of the liquid, the length and size of the conduit between orifices being such that a resistance to liquid flow through the conduit is offered that varies with changes in the viscosity of the liquid, the discharge orifice adjacent to said pump having such discharge capacity and said resistance in the conduit between said orifices being such that the pressure developed at the orifice adjacent the pump increases at different rates for different viscosities of the liquid while the pressure at said chamber increases in substantially the same proportion relative to speed of rotation of said shaft for different viscosities of said liquid.

6. A governor for delivering hydraulic pressure to a work chamber with said pressure increasing in proportion to increase in speed of rotation of a rotatable shaft, the governor comprising a constant displacement liquid pump driven by said shaft, a first by-pass orifice connected to the outlet of the pump so as to discharge liquid therefrom, a second by-pass orifice connected to the inlet of the chamber so as to discharge liquid therefrom, and a viscosimeter tube interposed between said orifices for delivering liquid from the outlet of the pump to the inlet of the chamber, the viscosimeter tube providing a resistance to liquid flow therethrough that varies with changes in viscosity of the liquid, the discharge capacities of said orifices being correlated so that as the flow resistance through the viscosimeter tube increases with an increase in viscosity of the liquid the first by-pass orifice will discharge proportionately more liquid than the second by-pass orifice and together with viscosimeter tube said by-pass orifices will cause the pressure in said chamber to vary with the speed of rotation of the shaft relatively uninfluenced by changes in viscosity of the liquid.

References Cited in the file of this patent

UNITED STATES PATENTS

| | | |
|---|---|---|
| 1,566,995 | Standerwick | Dec. 22, 1925 |
| 2,005,731 | Ernst | June 25, 1935 |
| 2,343,375 | Herman | Mar. 7, 1944 |